United States Patent [19]

Trombley et al.

[11] Patent Number: 4,955,341
[45] Date of Patent: Sep. 11, 1990

[54] IDLE CONTROL SYSTEM FOR A CRANKCASE SCAVENGED TWO-STROKE ENGINE

[75] Inventors: Douglas E. Trombley, Warren; Kenneth J. Buslepp, Utica, both of Mich.

[73] Assignee: General Motors Corporation, Detroit, Mich.

[21] Appl. No.: 408,868

[22] Filed: Sep. 18, 1989

[51] Int. Cl.$^5$ .......................... F02M 3/00; F02B 33/04
[52] U.S. Cl. .................... 123/339; 123/73 C; 123/305
[58] Field of Search ...................... 123/339, 73 C, 478, 123/305, 501

[56] References Cited

U.S. PATENT DOCUMENTS

| | | | |
|---|---|---|---|
| 2,724,371 | 11/1955 | Mallory | 123/501 |
| 2,746,441 | 7/1953 | Kremser | 123/501 |
| 3,196,859 | 7/1965 | Ziegler | 123/501 |
| 4,463,733 | 8/1984 | Tsai | 123/501 |
| 4,509,478 | 4/1985 | Ament et al. | 123/339 |
| 4,597,368 | 7/1986 | Ament | 123/339 |
| 4,800,862 | 1/1989 | McKay et al. | 123/73 C |
| 4,807,572 | 2/1989 | Schlunke | 123/73 C |

*Primary Examiner*—Tony M. Argenbright
*Assistant Examiner*—Robert E. Mates
*Attorney, Agent, or Firm*—Howard N. Conkey

[57] ABSTRACT

A method and apparatus for controlling the idling rotational speed of a direct fuel injected, crankcase scavenged, two-stroke engine are disclosed. This is accomplished by regulating the timing of engine fuel injection within the rotational cycle of the engine. If the engine idling speed is outside a predetermined range of speeds, containing a target idling speed, the timing of fuel injection is advanced within the rotational cycle of the engine to increse idling speed, or retarded to decrease idling speed. The value by which fuel injection timing is advanced or retarded is determined by the difference between the actual idling speed and the target idling speed. The target idling speed is made a function of engine operation temperature to assure that a cold engine will idle properly when first started. After fuel injection timing is changed, a predetermined period of time is waited before repeating the idle control steps, to allow engine speed to stabilize. The method also provides for advancing fuel injection timing by a relatively large amount in the event that the idling speed falls below a predetermined stalling speed. The stalling speed is made to depend upon engine operating temperature by equating it to the target idling speed reduced by a fixed quantity.

14 Claims, 4 Drawing Sheets

IDLE CONTROL SYSTEM FOR A CRANKCASE SCAVENGED TWO-STROKE ENGINE

BACKGROUND OF THE INVENTION

This invention relates to idle speed control for a direct fuel injected crankcase scavenged, two-stroke engine, and more particularly to a method and apparatus for stabilizing the rotational speed of such an engine at idle by controlling the time at which fuel is injected during the rotational cycle of the engine.

Customarily, it is desirable to minimize the idle speed of an internal combustion engine to improve fuel economy. However, when an engine is operated near its low speed stall limit, sudden engine loading or changing environmental conditions can decrease engine speed to the point where the generated torque is insufficient to overcome the engine load. As a result the engine stalls. To overcome this difficulty, a control system is generally employed to stabilize engine idle speed at a relatively low value, while insuring that engine stalling does not occur.

One method of controlling the idle speed of a conventional four-stroke engine consists of regulating the quantity of intake air delivered to the engine. This is generally accomplished by adjusting the intake air flow by means of a valve arranged in a passage which bypasses the engine air throttle valve. Unfortunately, a change in the quantity of intake air at idle has a very minimal effect on the output torque produced by a crankcase scavenged, two-stroke engine. Consequently, this method of idle control cannot be used effectively for this type of two-stroke engine.

The idle speed of a four-stroke engine can also be controlled by regulating the quantity of fuel per cylinder delivered to the engine. Combustion of a lean fuel mixture produces less engine output torque, and as a result, engine speed decreases. Again, due to the different operating characteristics of the crankcase scavenged, two-stroke engine, this method of idle control is not desirable. For the two-stroke, leaning out the air-fuel mixture at idle produces increased hydrocarbon emissions, cylinder misfiring, and rough engine idling.

Consequently, an alternative method of idle control is need for the crankcase scavenged, two-stroke engine to minimize engine idle speed for improved fuel economy, while stabilizing rotational speed to prevent engine stalling.

SUMMARY OF THE INVENTION

According to one aspect of the invention, the idling rotational speed of a direct fuel injected, crankcase scavenged, two-stroke engine is controlled by regulating the timing of the start of cylinder fuel injection during the rotational cycle of the engine. Due to the particular characteristics of this type of two-stroke engine, it has been found that a small change in fuel injector timing results in a large and nearly instantaneous change in engine output torque, and hence engine speed. As a consequence, engine idling speed can be controlled quickly and very precisely using this engine operating parameter.

According to another aspect of the invention, an adjustment in fuel injection timing is made only if the actual engine idling speed is outside a predetermined range of acceptable speeds containing a desired target idle speed. Fuel injection timing is advanced when the actual idling speed is lower than the lowest acceptable speed in the range and retarded when the idling speed is higher than the highest acceptable speed in the range. The value by which the timing is advance or retarded depends upon the difference between the actual idling speed and the target idling speed. As applied to a crankcase scavenged, two-stroke engine having an existing engine control system and a standard set of engine sensors, this method of idle control can be implemented by software changes alone, without the need for additional system hardware.

According to still another aspect of the invention, the desired target idling speed of the engine is made a function of the operating temperature of the engine. Thus, a cold engine, which has an increased likelihood of stalling, can be idled at a higher rotational speed until the engine warms up, thereby reducing the chance of stalling.

According to yet another aspect of the invention, if the idling speed of the engine falls below a predetermined stalling speed, fuel injection timing is advanced by a relatively large amount to quickly increase engine speed. This prevents engine stalling due to sudden, heavy engine loading, which acts to reduce engine output torque and rotational speed below the stalling limit. This technique can also be applied to a cold engine by equating the stalling speed to the target idling speed reduced by a predetermined quantity, with the target speed being temperature dependent.

These and other aspects and advantages of the invention may be best understood by reference to the following detailed description of a preferred embodiment when considered in conjunction with the accompanying drawing.

DESCRIPTION OF THE PREFERRED EMBODIMENT

Figure 1:
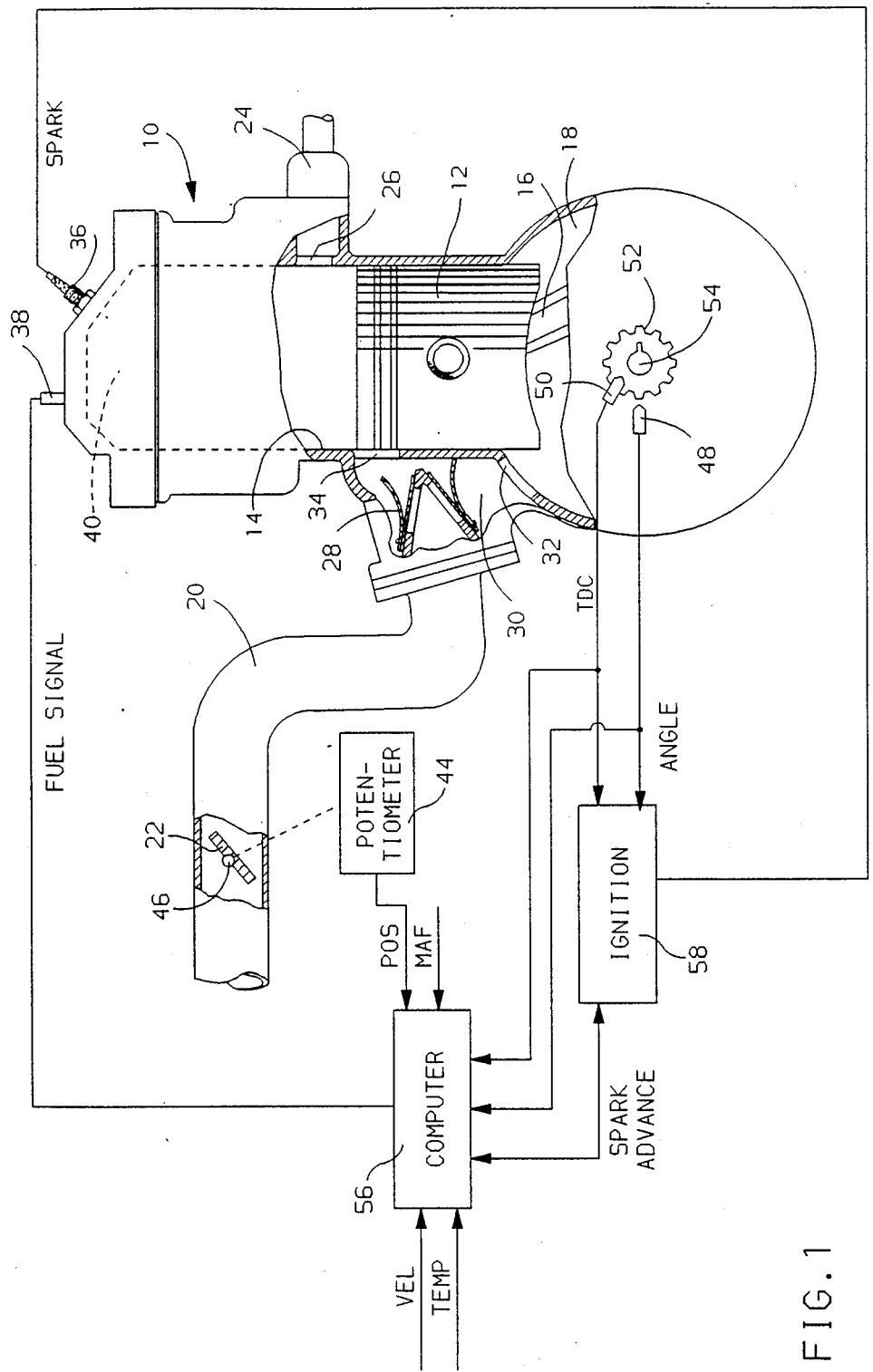
FIG. 1 is a schematic diagram of a crankcase scavenged two-stroke engine and a control system which includes the method of idle speed control according to the principles of this invention.

Referring to FIG. 1, there is shown schematically a crankcase scavenged two-stroke engine, generally designated as 10, with a portion of the engine exterior cut away, exposing a cylinder 14. Piston 12 resides within the wall of cylinder 14, with rod 16 connecting piston 12 to a rotatable crankshaft, not shown, but disposed within crankcase chamber 18. Connected to engine 10 is an air intake manifold 20 and an exhaust manifold 24. Within intake manifold 20 is a throttle valve 22 mounted on a rotatable shaft 46, for controlling air flow to engine 10. Cylinder 14 communicates with exhaust manifold 24 through exhaust port 26 in the wall of cylinder 14. Intake manifold 20 communicates with cylinder 14 and crankcase chamber 18 through a reed valve checking mechanism 28, which opens into a common air transfer passage 30 linking crankcase port 32 with inlet port 34 in the wall of cylinder 14. Cylinder 14 is provided with a spark plug 36 and an electric solenoid driven fuel injector 38 projecting into combustion chamber 40.

A conventional control system exists for controlling the operation of engine 10, but for clarity, only those sensors, or their related signals, which are important in describing the present invention are shown in FIG. 1. The many other sensors typically used to obtain information regarding engine operating parameters for the complete engine control will not be discussed. Also, the description of engine 10 and its accompanying control system will be limited specifically to cylinder 14, and can be easily extended and applied to other cylinders present in engine 10 by those skilled in the art of engine control.

Standard electromagnetic sensors 48 and 50 provide pulsed signals indicative of engine rotational angle (ANGLE) and the top dead center (TDC) position for cylinder 14, by respectively sensing the movement of teeth on ring gear 52 and disk 54, which are attached to the end of the engine crankshaft. The rotational position of throttle valve 22 is sensed by potentiometer 44 which is mechanically linked to shaft 46. Potentiometer 44 provides an output signal POS indicating the amount of throttle valve 22 opening within intake manifold 20.

Computer 56 is a conventional digital computer used by those skilled in the art of engine control, and includes the standard elements of a central processing unit, random access memory, read only memory, analog-to-digital converter, input/output circuitry, and clock circuitry.

Using pulsed input signals ANGLE and TDC from standard electromagnetic sensors 48 and 50, computer 56 determines the angular position of the engine crankshaft. The crankshaft rotation from top dead center in cylinder 14 may be obtained by counting the number of pulses occurring in ANGLE, after the TDC pulse, then multiplying the number of counted pulses by the angular spacing between the edges of the teeth on ring gear 52. A resolution of one degree or less can be achieved, when ring gear 52 has at least 180 teeth, since electromagnetic sensor 48 produces an output pulse for both edges of each tooth on gear 52.

The engine rotational speed in revolutions per minute (RPM) may be obtained by counting the number of TDC pulses, which occur in a specified period of time, and then multiplying by the appropriate conversion constant. This computed rotational speed is stored as a variable SPEED in read only memory and is updated during execution of the control program stored in computer 56.

The MAF input signal to computer 56 indicates the mass of air per cylinder flowing into engine 10. From the MAF input, computer 44 computes the proper amount of fuel per cylinder to be injected for maintaining the scheduled air-fuel ratio. The MAF signal can be derived from any suitable means known in the art, including a conventional mass air-flow sensor mounted within intake manifold 20, or alternatively, by computer processing of a signal produced by a pressure sensor placed within crankcase chamber 18. This later technique involves integration of the crankcase pressure over an interval of changing crankcase volume as disclosed in U.S. Application Ser. No. 377,383, filed July 10, 1989 by S. D. Stiles et al, co-pending with the present application and assigned to the same assignee.

Two remaining inputs, VEL and TEMP, are shown entering computer 56. The VEL signal represents the velocity in miles per hour (MPH) of a vehicle using engine 10 as a power source and is typically derived from a commercial speed transducer mounted on the engine transmission (not shown). The TEMP signal gives the temperature in degrees centigrade of the coolant fluid flowing through engine 10, and is typically derived from a common temperature sensor mounted within the engine cooling system.

Using the above inputs, and signals from other conventional sensors which have not been shown in FIG. 1, computer 56 performs the required computations, and provides an output FUEL SIGNAL to fuel injector 38. The FUEL SIGNAL consists of a pulse having a width that determines the time during which fuel injector 38 is operative and injecting fuel into cylinder 14. The width of the pulse is determined by computer 56, using standard calculations known in the art, to assure that the proper air-fuel mixture is delivered to cylinder 14. The leading edge of the output FUEL SIGNAL pulse determines the start of fuel injection into cylinder 14. Conventionally, computer 56 delivers the FUEL SIGNAL pulse at a time when the crankshaft angle of rotation from TDC in cylinder 14 is equal to FITIME. FITIME is the rotational angle in degrees before top dead center (BTDC) defining the start of cylinder fuel injection. A current value for FITIME is obtained by addressing a standard lookup table stored in computer read only memory, as a function of engine rotational speed (SPEED) and the mass air per cylinder (MAF), which is related to engine loading. The table of values for FITIME is obtained by standard engine mapping procedures on a dynamometer.

A SPARK ADVANCE signal, related to spark timing during the engine operating cycle, is determined by computer 56 and delivered to ignition system 58. The value for SPARK ADVANCE is determined by addressing another lookup table stored in computer memory, as described previously for fuel injection timing. Ignition system 58 generates a high voltage SPARK signal to fire spark plug 36 at the appropriate rotational angle, using the ANGLE, TDC, and SPARK ADVANCE inputs.

The operation of engine 10 will now be briefly described based upon the cycle occurring in cylinder 14. During the upstroke, piston 12 moves from its lowest position in cylinder 14 toward top dead center. During the upward movement of piston 12, air inlet port 34 and exhaust port 26 are closed off from the combustion chamber 40, and thereafter, air is inducted into crankcase chamber 18 through reed valve 28. Air in combustion chamber 40 is compressed above piston 12, and at the appropriate time before top dead center, fuel injector 38 is enabled by the FUEL SIGNAL pulse supplied by computer 56. The resulting air-fuel mixture is ignited when spark plug 36 fires near the top of the stroke in cylinder 14. As combustion is initiated, piston 12 begins the downstroke, decreasing the volume of crankcase chamber 18 and the inducted air within it, due to closure of valve reed valve 28. Toward the end of the downstroke, piston 12 uncovers exhaust port 26 to release the combusted fuel, followed by uncovering of the inlet port 34, enabling compressed air within the crankcase chamber 18 to flow through the air transfer passage 30 into cylinder 14. The cycle begins anew when piston 12 reaches the lowest point in cylinder 14.

It is customary to minimize the rotational idle speed of an internal combustion engine to improve fuel economy, however, due to the unique operating characteristic of the crankcase scavenged engine 10, conventional methods of idle control can not be used. For engine 10, changing the quantity of intake air at engine idling speed has a very minimal effect on the output torque. Consequently, the combination of an air bypass passage with an associated control valve, in parallel with throttle value 22 in intake manifold 20, can not be used to effectively control the idling speed of this type of engine. Another technique used to control idle consists of regulating the quantity of fuel per cylinder delivered at engine idling speed. A leaner air-fuel mixture results in less output engine torque, and typically provides a means for controlling idling speed. Again, this method can not be utilized with the crankcase scavenged, two stroke engine 10, since leaning out the air-fuel mixture at idling speed results in increased hydrocarbon emissions, cylinder misfiring, and rough engine idle.

Figure 2:
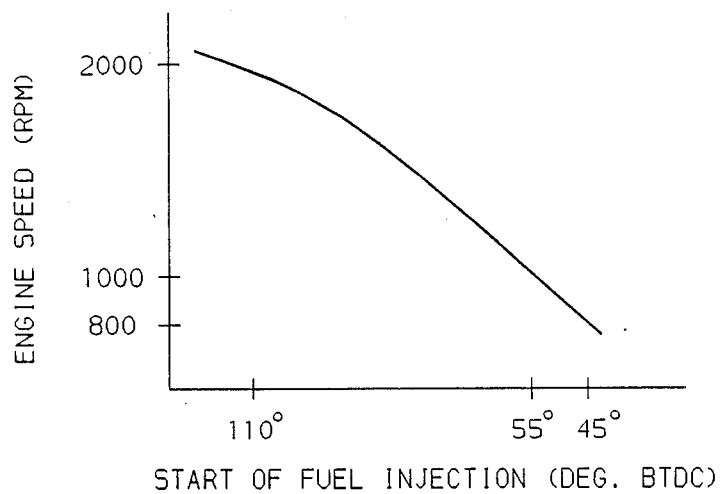
FIG. 2 is a graphical representation of engine idling speed as a function of the timing of cylinder fuel injection during the rotational cycle of the engine.

Referring now to FIG. 2, there is shown a graph of the typical unloaded idling speed of a crankcase scavenged, two-stroke engine, in revolutions per minute (RPM), as a function of the start of cylinder fuel injection, in degrees BTDC. Due to the unique operating characteristics of this type of engine, idling speed is extremely sensitive to small changes in the timing of fuel injection. It is thought that this behavior results because of the interaction between the build up pressure within the combustion chamber 40 and the depth of fuel injector spray into cylinder 14. The pressure within combustion chamber 40 increases as piston 12 moves upward toward the TDC position in cylinder 14. It has been found that as pressure increases within combustion chamber 40, the depth of penetration of injector fuel spray into cylinder 14 decreases. This reduces the combustion efficiency of the air-fuel mixture, resulting in less engine output torque, and consequently, a decrease in engine speed under a given load. Thus, large changes in the rotational idling speed of engine 10 can be achieved by making relatively small changes in the timing of the start of cylinder fuel injection.

The present invention is directed toward utilizing this behavior to control engine idling speed by regulating the starting time of cylinder fuel injection. By advancing the time at which cylinder fuel injection starts, engine output torque and idling speed are increased, and conversely, when the timing of fuel injection is retarded, engine torque and idling speed decrease. This relationship provides a simple and convenient method for the control of idling speed, which can be implemented by merely adding software to an existing engine control system having the typical sensors and transducers.

Figure 3:
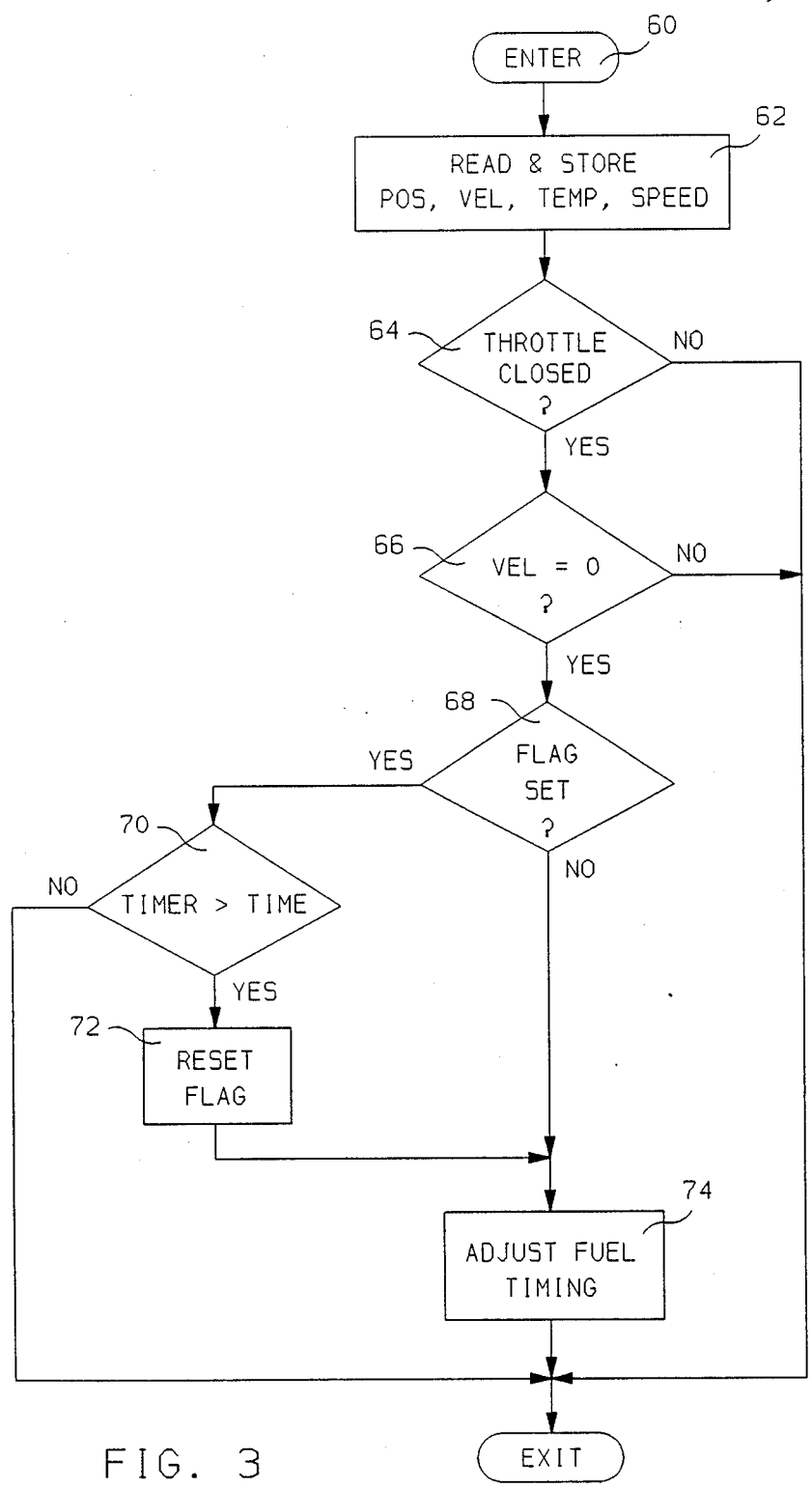
FIGS. 3 and 4 are flow diagrams illustrating the operation of the computer of FIG. 1 in controlling the idle speed of a crankcase scavenged, two-stroke engine in accord with the principles of this invention.

Referring now to FIG. 3, there is shown a simplified flow diagram illustrating the steps executed by computer 56 in regulating the timing of cylinder fuel injection to control the idling speed of engine 10. After engine startup, all counters, flags, registers, and timers within computer 56 are first initialized. After this preliminary initialization, computer 56 continuously executes a looped engine control program. The Idle Control Routine shown in FIG. 3 is part of the main program and is entered approximately every 8 milliseconds as the computer 56 performs its other control functions.

The Idle Control Routine is entered at point 60, and proceeds to step 62 where values for the throttle position (POS), vehicle velocity (VEL), engine coolant temperature (TEMP), and engine rotational speed (SPEED) are derived from the associated sensors, and stored in random access memory.

The routine next executes the decision steps 64 and 66 to determine if engine 10 is operating at idle. In decision step 64, if the throttle is not closed, as indicated by POS, the engine is not at idle and the routine is exited. If the throttle is closed, the program proceeds to decision step 66, where it is determined whether or not the vehicle velocity, as indicated by VEL, is zero. If VEL is some value other than zero, the engine is found not to be operating at idle, and again the routine will be exited. Only when both conditions are satisfied, that is closed throttle and zero vehicle velocity, will the program decide the engine is at idle and proceed to the next step 68. In another embodiment of the present invention, it may be desirable to decide the engine is at idle when VEL has a value which is only slightly larger than zero.

At step 68, a decision is made as to whether FLAG has been set different from the initialized value at engine startup. If Flag has not been set, then the program proceeds to step 74, where the Adjust Fuel Timing Routine is executed. During this routine, which will be described in greater detail with respect to FIG. 4, a change in cylinder fuel injection timing is made if the engine idle speed needs correcting. If the fuel injection timing was changed during a previous pass through the Adjust Fuel Timing Routine, then FLAG will have been set, a variable TIME will have been assigned a predetermined value, and a TIMER will have been reset to count toward that assigned value of TIME. The purpose of the TIMER and assigned TIME is to assure that a sufficient time period is waited for engine 10 to sufficiently react to any change made in the fuel injection timing. Referring again to step 68, if FLAG is set, then this indicates that a change has recently been made to the fuel injection timing, and the program proceeds to step 70.

At step 70 the decision is made as to whether the TIMER has counted beyond the value set for the TIME variable. If not enough time has passed for engine 10 to have sufficiently reacted to the change in fuel injection timing, TIMER will not be greater than TIME, and the Idle Control Routine is exited. If sufficient time has passed and TIMER Is greater than TIME, then the program proceeds to step 72.

At step 72, FLAG is reset to its initialized value and the Adjust Fuel Timing Routine starting at step 74 is entered to determine if another change in fuel injection timing is required to correct the engine idling speed.

Figure 4:
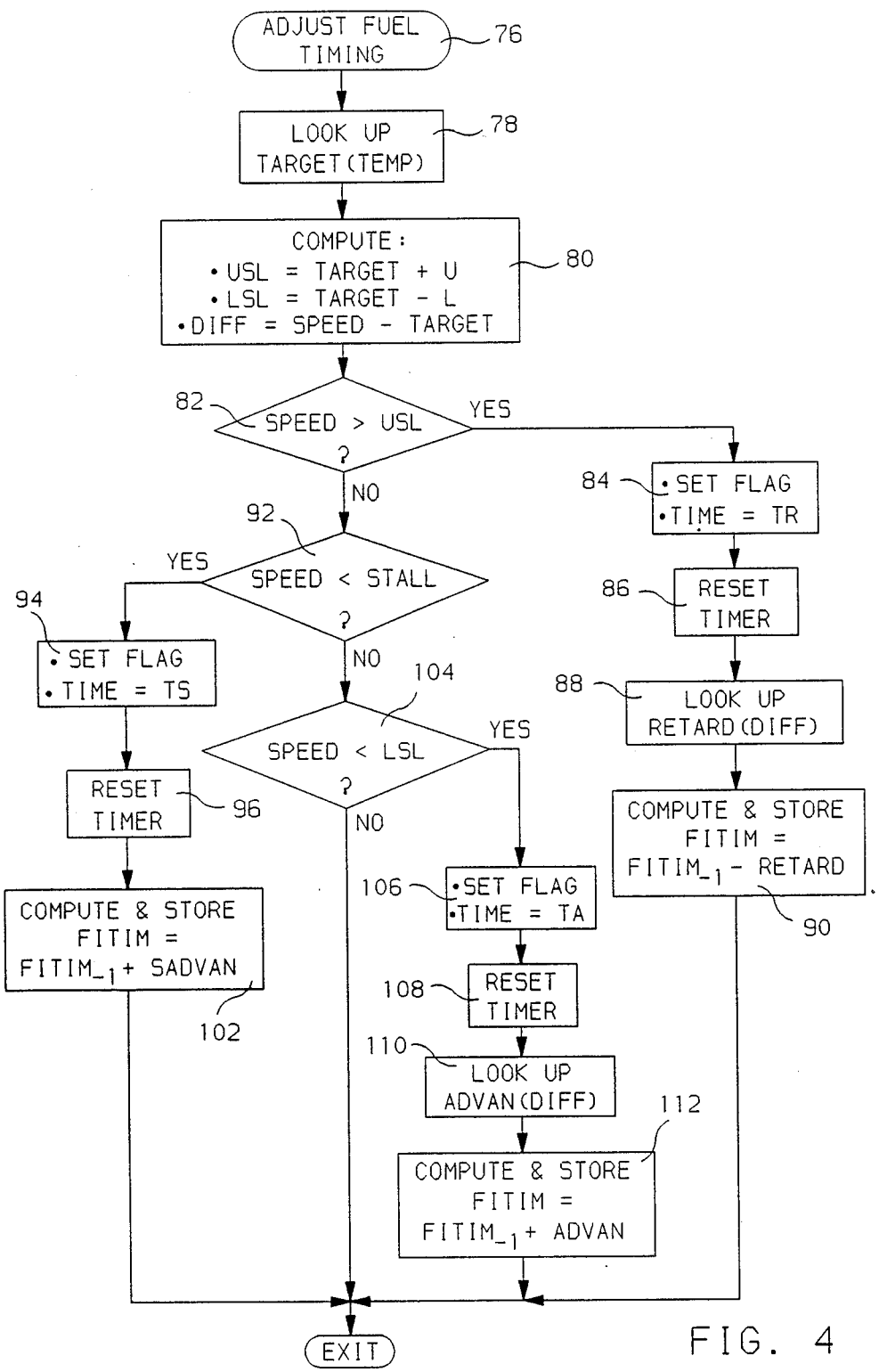

Referring now to FIG. 4, the Adjust Fuel Timing Routine will be described in more complete detail. This routine is entered at point 76 and then proceeds to step 78, where a value for the desired target idling speed (TARGET) is found in a lookup table stored in memory as a function of the engine coolant temperature (TEMP).

Figure 5:
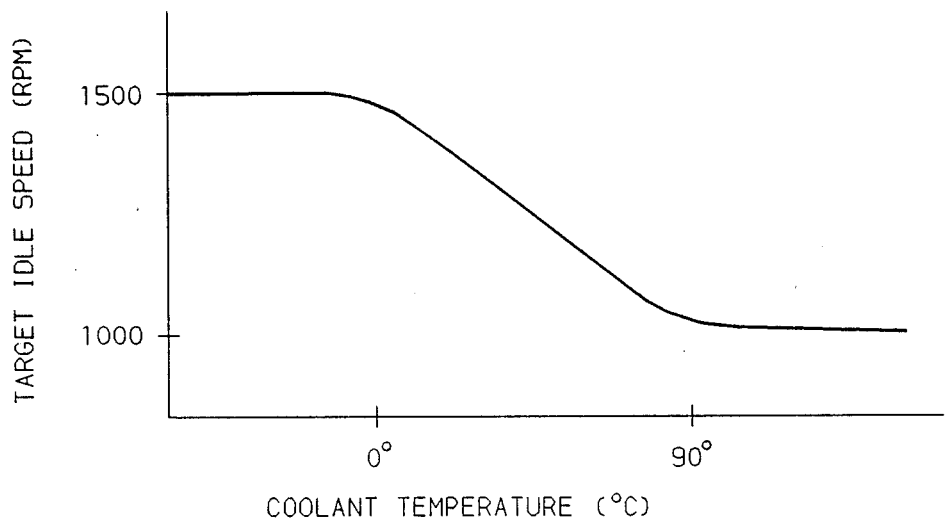
FIG. 5 is a graphical representation of desired target idling speed as a function of engine coolant temperature.

FIG. 5 shows a typical plot of how the desired target idling speed varies as a function of coolant temperature, for a 1.2 liter, 3 cylinder, crankcase scavenged, two-cycle engine having a manual transmission, to which the preferred embodiment of the present invention has been applied. A target idling speed of 1500 RPM is desired to prevent stalling when the engine is started cold with the coolant temperature less than 0 degrees centigrade. However, when the engine coolant temperature rises above 90 degrees centigrade, the target idling speed can be lowered to 1000 RPM without increasing the chance of engine stall.

Referring again to FIG. 4, after the desired TARGET idling speed is determined in step 78, the program proceeds to step 80 where values for several variables are computed. The first two computed variables USL and LSL establish an acceptable range of idling speeds around the desired target idling speed, for which no changes will be made to fuel injection timing. The upper speed limit for the range (USL) is computed by adding the variable U to the target idling speed. The lower speed limit for the range (LSL) is computed by subtracting the variable L from the TARGET idling speed. Although L and U may have many acceptable values, in the preferred embodiment of the present invention, the values of L=20 RPM and U=40 RPM have been chosen. The value for L is chosen slightly smaller than U, due to the increased chance of engine stalling at idling speeds less than the target idling speed. As an example then, once the engine warms up, TARGET is set to 1000 RPM from a lookup table having values chosen from the graph of FIG. 5. As will be described subsequently, the actual idling speed (SPEED) can be in a range from 980 to 1040 RPM, around TARGET, without effectuating a change in fuel injection timing. Also in step 80, a value of DIFF is computed by subtracting the target idling speed (TARGET) from the actual idling speed (SPEED).

At step 82, a decision is made as to whether the actual idling speed (SPEED) is greater than the permitted upper speed limit (USL) as computed in step 80. If SPEED is greater than USL, then steps 84 through 90 are executed to retard the timing of cylinder fuel injection and reduce the engine idling speed.

At step 84, FLAG is set indicating that a change will be made in cylinder fuel injection timing, and wait TIME is set to the value TR to allow engine 10 to sufficiently react to a retarded change in the timing. Next at step 86, TIMER is reset, to beginning counting toward the wait TIME=TR. At step 88, a value for RETARD, the amount that fuel injection timing is to be retarded in degrees of engine rotation, is looked up in a table stored in computer memory as a function of DIFF, the difference between the actual and target idling speeds found earlier in step 80. Although other values can be chosen, in the preferred embodiment of the present invention, TR=250 milliseconds to allow for engine reaction to the retarding of timing, and RETARD=1 degree for all values of DIFF. In other embodiments of the invention, RETARD can be made to vary with different values of DIFF. For example it may be desirable to set RETARD=1 degree when DIFF is less than 200 RPM, but make RETARD=2 degree when DIFF is equal to or greater than 200 RPM. Thus, for larger values of DIFF, larger values of RETARD could be used to more rapidly move the actual idling speed toward the desired target idling speed. In the remaining step 90 of the retard timing sequence, a new value for fuel injection timing FITIM is computed by subtracting the value of RETARD from $FITIM_{-1}$, the old value for FITIM. The new retarded value for FITIME is stored in memory to replace the old value, so that computer 56 will retard the timing of the next output FUEL SIGNAL pulse to injector 38. After step 90, the routine is exited.

Returning now to step 82, if SPEED is found to be less than or equal to USL, then the program proceeds to the next decision step 92. There, the decision is made as to whether SPEED is less than STALL, the rotational speed for which an engine stall is certain to occur. If SPEED is less than STALL, then the program proceeds to execute the sequence of steps 94 through 102 to rapidly advance the cylinder fuel injection timing to bring idling speed above the stall speed.

At step 94, FLAG is set to indicate a change in timing will be made, and the wait TIME is set equal to TS, to allow the engine sufficient time to react to the advance in fuel injection timing to prevent stalling. Next at step 96, the TIMER is reset to begin counting toward the wait TIME=TS. In the preferred embodiment of the present invention, TS=250 milliseconds, the same value used for TR in step 84 when fuel injection timing is retarded. For other embodiments of the invention, it may be desirable to reduce TS to be less than TR to enable a more rapid corrections to fuel injection timing when the engine is in a stalling condition. At step 102 of the stall advance timing sequence, FITIM is computed by adding SADVAN to $FITIM_{-1}$, the old value for FITIM. SADVAN is the amount by which fuel injection timing is advanced to prevent stalling. In the preferred embodiment, SADVAN=5 degrees, but it may be desirable to use different values for other embodiments of the present invention. The new advanced value for FITIM is stored in memory to replace the old value and the routine is exited. Computer 56 will advance the timing of the next output FUEL SIGNAL pulse to injector 38.

Returning now to step 92, if SPEED is found to be greater than or equal to STALL, then the program proceeds to the next decision step 104. There, the decision is made as to whether SPEED is less than LSL, lower limit of the range of acceptable idle speeds. IF SPEED is equal to or greater than LSL, the Adjust Fuel Timing Routine is exited, since SPEED is within the acceptable range of idling speed from LSL to USL, and an adjustment to fuel injection timing is not required. However, if SPEED is less than LSL, then the program proceeds to execute steps 106 through 112 to advance the timing of cylinder fuel injection and increase the actual idling speed.

AT step 106, FLAG is set to indicate a change in timing will be made, and wait TIME is set equal to TA, to allow the engine sufficient time to react to the advance in fuel injection timing. Next at step 108 the TIMER is reset to begin counting toward the wait TIME=TA. At step 110, a value for ADVAN, the amount to advance fuel injection timing, is looked up in a table stored in memory as a function of DIFF, which was found previously at step 80. In the preferred embodiment of the present invention, TA=250 milliseconds, the same value used for TR and TS in steps 84 and 94, respectively. In other embodiments of the invention, it may be desirable to chose a different value for TA, perhaps less than TR, to assert more rapid control when the idling SPEED is below the TARGET idling speed, rather than above it. Also, in the preferred embodiment, ADVAN=1 degree for all values of DIFF. Again, in other embodiments of the invention, it may be desirable to increase ADVAN by larger increments for larger differences between actual and target idling speeds. In the remaining step 112 of the advance timing sequence, a new value for fuel injection timing FITIM is computed by adding ADVAN to $FITIM_{-1}$, the old value for FITIM. The new advanced value for FITIM is stored in memory to replace the old value so that computer 56 will advance the timing of the next output FUEL SIG- NAL pulse to injector 38. After step 112, the routine is exited.

Once exited, the Idle Control Routine is reentered again after approximately 8 milliseconds at point 60, and the entire sequence of program steps just described is repeated to determine if a new adjustment to the fuel injection timing is required for idle speed correction.

The aforementioned description of a preferred embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. In a direct cylinder fuel injected, scavenged two-stroke engine, the improvement comprising means for controlling the idle speed of the engine by regulating the timing of the start of cylinder fuel injection during the engine cycle, as a function of the difference between the actual idle speed and a desired target idle speed, so that a relatively large and nearly instantaneous change in engine output torque and associated idle speed can be achieved in response to a relatively small change in cylinder fuel injection timing.

2. The improvement of claim 1, wherein the start of cylinder fuel injection timing is advanced when the actual idle speed is lower than the lowest acceptable speed in a range of speed which embraces the target idling speed and is retarded when the idle speed is higher than the highest acceptable speed in the range of speeds, the amount by which the start of cylinder fuel injection is advanced or retarded being determined as a function of the difference between the actual idle speed and the target idle speed.

3. The improvement of claim 2, wherein the target idle speed is determined as an inverse function of engine temperature so as to reduce the likelihood of stalling the engine at relatively cold temperatures.

4. The improvement of claim 2, wherein the start of fuel injection timing is advanced by a relatively large predetermined amount when the actual idle speed is lower than a defined engine stalling speed, so as to rapidly increase engine idling speed to avoid stalling.

5. The improvement of claim 4, wherein the defined stalling speed is equal to the target idle speed reduced by a fixed quantity, so that stalling speed is also an inverse function of engine temperature.

6. A method for controlling the rotational idling speed of a direct cylinder fuel injected, scavenged two-stroke engine, which comprises controlling engine idling speed by regulating the timing of the start of fuel injection during the rotational cycle of the engine, as a function of the difference between the actual idling speed and a desired target idling speed, so as to obtain an acceptable engine idling speed.

7. The method of idle speed control of claim 6, wherein the regulation of fuel injection timing includes:

deriving an indication of the actual rotational idling speed of the engine;
determining whether the actual idling speed is outside a predetermined range of engine speeds containing the desired target idling speed;
determining the difference between the actual idling speed and the target idling speed;
changing the timing of the start of cylinder fuel injection within the rotational cycle of the engine by a value dependent upon the difference between the actual idling speed and the target idling speed, when the actual idling speed is outside the predetermined range; and
repeating the above steps after waiting a defined period of time determined by the amount and direction of change in fuel injection timing.

8. The method of idle speed control in claim 7, wherein changing the timing of fuel injection comprises advancing fuel injection with respect to the occurrence of cylinder top dead center when the actual idling speed is less than the target idling speed, and retarding fuel injection with respect to cylinder top dead center when the actual idling speed is greater than the target idling speed.

9. The method of idle speed control in claim 7, wherein the predetermined range of engine speeds is defined by an upper limit speed and a lower limit speed, the difference between the upper limit speed and the target speed being greater than the difference between the target speed and the lower limit speed.

10. The method of idle speed control in claim 7, wherein the predetermined range of engine speeds and the desired target idling speed contained therein, are functions of the engine operating temperature.

11. The method of idle speed control in claim 7, further including within the repeated steps, the steps of:
determining whether the idling speed of the engine is less than a predetermined stalling speed;
advancing the fuel injection timing by a predetermined amount when the idling speed is less than the stalling speed.

12. The method of idle speed control in claim 11, wherein the stalling speed is equal to the desired target idling speed reduced by a fixed quantity.

13. A system for controlling the rotational idling speed of a direct cylinder fuel injected, scavenged two-stroke engine, comprising:
means for sensing the speed of the engine; and
means for adjusting the timing of cylinder fuel injection in accord with a difference between the sensed speed and a desired target idle speed and in a direction to reduce the difference.

14. A method for controlling the rotational idling speed of a direct cylinder fuel injected, scavenged two-stroke engine, comprising:
sensing the speed of the engine; and
adjusting the timing of cylinder fuel injection in accord with a difference between the sensed speed and a desired target idle speed and in a direction to reduce the difference.

* * * * *